United States Patent
Hornung et al.

(10) Patent No.: US 11,066,604 B2
(45) Date of Patent: Jul. 20, 2021

(54) PYROLYSIS OIL AND METHOD AND SYSTEM FOR THE PRODUCTION THEREOF

(71) Applicant: Fraunhofer-Gesellschaft zur Förderung der angewandten Forschung e.V., Munich (DE)

(72) Inventors: Andreas Hornung, Karlsruhe (DE); Andreas Apfelbacher, Amberg (DE); Miloud Ouadi, Birmingham (GB); Johannes Neumann, Hersbruck (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/684,448

(22) Filed: Aug. 23, 2017

(65) Prior Publication Data

US 2017/0362512 A1 Dec. 21, 2017

Related U.S. Application Data

(63) Continuation of application No. PCT/EP2015/078143, filed on Dec. 1, 2015.

(30) Foreign Application Priority Data

Feb. 27, 2015 (DE) ..................... 10 2015 102 819.0
May 29, 2015 (DE) ..................... 10 2015 108 552.6

(51) Int. Cl.
*C10B 53/02* (2006.01)
*C10G 3/00* (2006.01)
(Continued)

(52) U.S. Cl.
CPC .............. *C10B 53/02* (2013.01); *C10B 53/00* (2013.01); *C10B 53/07* (2013.01); *C10B 57/12* (2013.01);
(Continued)

(58) Field of Classification Search
CPC ......... C10B 53/00; C10B 53/02; C10B 53/07; C10B 57/12; C10B 57/18; C10K 3/02;
(Continued)

(56) References Cited

U.S. PATENT DOCUMENTS 4,028,068 A * 6/1977 Kiener ................... C10B 53/00
48/209
8,383,871 B1 * 2/2013 Sellars ................... C10G 45/08
585/240

(Continued)

FOREIGN PATENT DOCUMENTS

CL    2012/03469         12/2012
CN    104087340 A   *   10/2014  ............. Y02P 20/52
(Continued)

OTHER PUBLICATIONS

Chen et al. (Bamboo pyrolysis using TG-FTIR and a lab-scale reactor: Analysis of pyrolysis behavior, product properties, and carbon and energy yields. Fuel, 148, 79-86) (Year: 2015).*
(Continued)

*Primary Examiner* — Jonathan Miller
*Assistant Examiner* — Gabriel E Gitman
(74) *Attorney, Agent, or Firm* — Brinks Gilson & Lione

(57) ABSTRACT

A method for producing a pyrolysis oil is described. In said method, a feedstock to be treated is first pyrolyzed in a pyrolysis zone, in which the feedstock is heated to a temperature of 250 degrees Celsius to 700 degrees Celsius; and pyrolyzed solids and pyrolysis vapors are formed. The pyrolysis vapors are then reformed at a temperature of 450 degrees Celsius to 1,200 degrees Celsius in a post-conditioning zone, in which the pyrolysis vapors are brought into contact with a catalyst bed, wherein the pyrolysis oil is formed. In this case, the catalyst comprises a pyrolyzed solid, which can be obtained according to the pyrolysis,
(Continued)

described above. Finally the pyrolysis oil is separated from the additional pyrolysis products, which are formed, in a separation unit.

25 Claims, 2 Drawing Sheets

(51) Int. Cl.
| | |
|---|---|
| C10G 1/02 | (2006.01) |
| C10C 5/00 | (2006.01) |
| C10G 1/10 | (2006.01) |
| C10L 1/02 | (2006.01) |
| C10B 53/00 | (2006.01) |
| C10K 3/02 | (2006.01) |
| C10B 57/18 | (2006.01) |
| C10B 53/07 | (2006.01) |
| C10B 57/12 | (2006.01) |

(52) U.S. Cl.
CPC ............... *C10B 57/18* (2013.01); *C10C 5/00* (2013.01); *C10G 1/02* (2013.01); *C10G 1/10* (2013.01); *C10G 3/00* (2013.01); *C10G 3/44* (2013.01); *C10K 3/02* (2013.01); *C10L 1/02* (2013.01); *C10G 2300/1003* (2013.01); *C10G 2300/1011* (2013.01); *C10G 2300/1014* (2013.01); *C10G 2300/1018* (2013.01); *C10G 2400/30* (2013.01); *Y02E 50/10* (2013.01); *Y02P 30/20* (2015.11)

(58) Field of Classification Search
CPC .... C10L 1/02; C10C 5/00; C10G 3/00; C10G 1/02; C10G 1/10; C10G 2300/1003; C10G 2300/1011; C10G 2300/1014; C10G 2300/1018; C10G 2400/30; C10G 3/44; Y02E 50/14; Y02P 30/20
See application file for complete search history.

(56) References Cited

U.S. PATENT DOCUMENTS

| | | | |
|---|---|---|---|
| 8,628,589 B2 | 1/2014 | Ramirez Corredores et al. | |
| 9,453,166 B2 | 9/2016 | Huber et al. | |
| 2006/0024390 A1* | 2/2006 | Schauss | A61K 36/889 424/727 |
| 2011/0067991 A1* | 3/2011 | Hornung | C10J 3/20 201/32 |
| 2011/0308155 A1* | 12/2011 | Paskach | C10J 3/463 48/77 |
| 2012/0073199 A1* | 3/2012 | Lewis | C12M 43/00 48/127.5 |
| 2012/0117860 A1* | 5/2012 | Brady | B01J 23/90 44/307 |
| 2012/0203042 A1* | 8/2012 | Huber | C10B 57/06 585/241 |
| 2012/0217150 A1* | 8/2012 | Kostek, Sr. | B01D 5/0006 202/108 |
| 2012/0260563 A1 | 10/2012 | Marker | |
| 2013/0105356 A1* | 5/2013 | Dijs | C10G 7/04 208/15 |
| 2013/0153826 A1* | 6/2013 | Paquet | C10K 3/001 252/373 |
| 2013/0306913 A1* | 11/2013 | Li | C10K 3/04 252/373 |
| 2014/0288338 A1* | 9/2014 | Radlein | C10G 3/44 585/251 |

FOREIGN PATENT DOCUMENTS

| | | | | |
|---|---|---|---|---|
| CN | 104087340 A | 10/2014 | | |
| CN | 104357076 A | 2/2015 | | |
| DE | 119607 | 5/1976 | | |
| DE | 3040227 | 5/1982 | | |
| DE | 19737403 C1 | 12/1998 | | |
| JP | 2010126595 A | * | 6/2010 | ............... C10J 3/00 |
| JP | 2013-504651 A | 2/2013 | | |
| JP | 2014-511940 A | 5/2014 | | |
| WO | WO 03/002691 | 1/2003 | | |
| WO | WO 2010/130988 A1 | 11/2010 | | |
| WO | WO 2012/117860 A1 | 2/2012 | | |
| WO | WO 2015/104430 | 1/2015 | | |
| WO | WO 2015/158732 A1 | 10/2015 | | |

OTHER PUBLICATIONS

Dabai et al. (Tar formation and destruction in a fixed bed reactor simulating downdraft gasification: effect of reaction conditions on tar cracking products. Energy & fuels, 28(3), 1970-1982) (Year: 2014).*
Sun et al. (Decomposition and gasification of pyrolysis volatiles from pine wood through a bed of hot char. Fuel, 90(3), 1041-1048) (Year: 2011).*
Neumann et al. (Production and characterization of a new quality pyrolysis oil, char and syngas from digestate-Introducing the thermo-catalytic reforming process. Journal of analytical and applied pyrolysis, 113, 137-142) (Year: 2014).*
Mahmood et al. (2013, The intermediate pyrolysis and catalytic steam reforming of Brewers spent grain. Journal of analytical and applied pyrolysis, 103, 328-342) (Year: 2013).*
Neumann et al. (2015, Production and characterization of a new quality pyrolysis oil, char and syngas from digestate-Introducing the thermo-catalytic reforming process. Journal of analytical and applied pyrolysis, 113, 137-142) (Year: 2015).*
Dabai et al. (2014, Tar formation and destruction in a fixed bed reactor simulating downdraft gasification: effect of reaction conditions on tar cracking products. Energy & fuels, 28(3), 1970-1982) (Year: 2014).*
CN104087340A_ENG (Espacenet machine translation of Chen) (Year: 2014).*
JP2010126595A_ENG (Espacenet machine translation of Junichiro) (Year: 2010).*
Elliott, Douglas C., "Catalytic Hydroprocessing of Biomass Fast Pyrolysis Bio-oil to Produce Hydrocarbon Products," dated Aug. 5, 2009, pp. 441-449, Environmental Progress & Sustainable Energy (vol. 28, No. 3).
Gilbert, P., "Tar reduction in pyrolysis vapours from biomass over a hot char bed," dated Jul. 14, 2009, pp. 6045-6051, Bioresource Technology (2009).
International Search Report with English translation, dated Mar. 8, 2016, pp. 1-10, PCT/EP2015/078143, European Patent Office, Rijswijk, Netherlands.
Neumann, Johannes, "Production and characterization of a new quality pyrolysis oil, char and syngas from digestate—Introducing the thermo-catalytic reforming process," dated Dec. 2, 2014, pp. 1-6, Journal of Analytical and Applied Pyrolysis.
"Radiokarbonmethode," dated Feb. 14, 2015, pp. 1-14, Wikipedia, available at de.wikipedia.org.
Ren, S., "Hydrocarbon and hydrogen-rich syngas production by biomass catalytic pyrolysis and bio-oil upgrading over biochar catalysts," dated Feb. 3, 2014, p. 10731, RSC Advances.
First Office Action with English translation, issued in CN Application No. 201580077036.2, dated Oct. 22, 2019, pp. 1-15, National Intellectual Property Administration of the People's Republic of China, Beijing, CN.
Second Office Action with English translation, issued in Chinese Patent Application No. 201580077036.2, dated Sep. 30, 2020, pp. 1-12, National Intellectual Property Administration of the People's Republic of China, Beijing, China.
First Office Action with English translation, issued in Chinese Patent Application No. 201580077036.2, dated Oct. 22, 2019, pp. 1-15, National Intellectual Property Administration of the People's Republic of China, Beijing, China.

* cited by examiner

PYROLYSIS OIL AND METHOD AND SYSTEM FOR THE PRODUCTION THEREOF

CROSS-REFERENCE TO RELATED APPLICATIONS

This application is a continuation of international patent application of PCT/EP2015/078143 filed Dec. 1, 2015, the entire contents of which are hereby incorporated by reference, which in turn claims priority under 35 USC § 119 to German patent application DE 10 2015 108 552.6 filed on May 29, 2015, and to German patent application DE 10 2015 102 819.0 filed on Feb. 27, 2015.

TECHNICAL FIELD

The invention relates to a pyrolysis oil and a thermocatalytic method and a system for the production thereof, in particular, from at least partially biogenic feedstocks.

DETAILED DESCRIPTION

Figure 1:
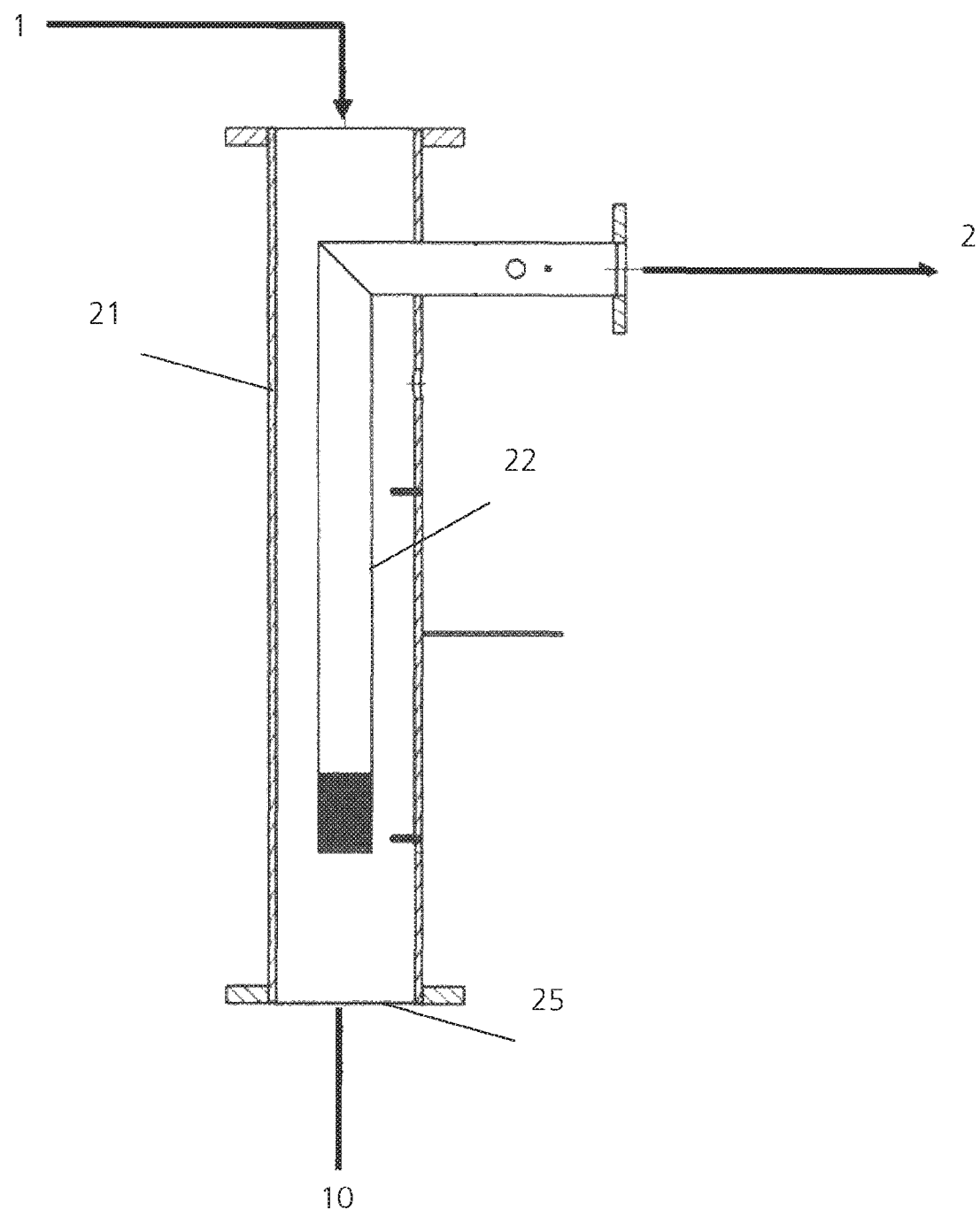
FIG. 1 shows a true-to-scale diagram of a reforming reactor, which is used in accordance with the present invention.

Pyrolysis is used to thermally convert carbonaceous feedstocks, for example, biomass, into liquid pyrolysis concentrate (pyrolysis oil), solid pyrolysis coke and pyrolysis gas as pyrolysis products and is carried out in the absence of oxygen or at least substantially without the presence of oxygen. The fractions and the quality of the pyrolysis products can be influenced, on the one hand, by the choice of feedstock (and, in particular, also by its residual moisture), but primarily by the prevailing conditions of the process. Some examples, which can be mentioned in this respect, are, in particular, the pyrolysis temperature, the residence time in the pyrolysis zone and optionally the subsequent post-processing steps.

Thus, pyrolysis constitutes a method, in which the aforementioned pyrolysis products can be produced for a wide range of applications under specific conditions without the presence of oxygen at temperatures between 250 and 1,050 degrees Celsius. During pyrolysis a distinction is made between fast pyrolysis (flash and fast pyrolysis) and slow pyrolysis (slow pyrolysis), which depends in essence on the rate of heating the feedstock that is used. In addition, even the so-called intermediate pyrolysis exists in the mean temperature range at mean residence times (as disclosed, for example, in WO 2010/130988 A1). Each of these different types of pyrolysis can also be characterized by the extent to which solids, gases and liquids (and here, in turn, the aqueous and organic phases) are formed with the pyrolysis process.

With fast pyrolysis large amounts of condensable organic liquids are obtained. These oils contain a variety of organic compounds (such as alcohols, sugars, furans, phenols, other aromatic compounds, ketones, carboxylic acids and water). If a biogenic feedstock is used, then these components are obtained, in particular, from the decomposition of the cellulose, hemicellulose and lignin derivatives contained therein. The oils that are formed are superior to solids, in particular, because of their higher energy density and because they are easier to store and transport.

However, pyrolysis oils, which are produced by fast pyrolysis, have the disadvantage that they do not lend themselves to fuels for running the engines of motor vehicles. The pyrolysis oils that are produced have a very high oxygen content, a feature that makes them unstable and prone to aging effects (such as polymerization). Furthermore, the resulting oils are very viscous (due to a high content of oligomers and compounds with high molecular weights) and also corrosive (due to the presence of acids). Finally, the water content of these oils is greater than 25% by wt. The net result is poor miscibility with conventional fuels, such as gasoline or diesel, a reduced calorific value and poor combustion properties.

Slow pyrolysis has been used to produce charcoal for decades. In this case, the residence time of the material to be pyrolyzed in the pyrolysis zone ranges from hours to days. A feedstock is used that has a low moisture content of less than 25%, in particular, wood. The process does not lend itself or lends itself very poorly to other biomaterials as feedstocks.

In addition to fast and slow pyrolysis, the intermediate pyrolysis can be used in the mean temperature range at mean residence times. The published document WO 2010/130988 A1 discloses such a process, in which depending on the particle diameter of the feedstock that is used, the residence time can be several minutes. In this case pyrolysis leads to products, in which the tar content is reduced. However, here, too, there is the problem that the products do not lend themselves as fuel for vehicles.

S. Ren et al. (RSC Adv., 2014, vol. 4, p. 10731) describe a method for microwave pyrolysis of pellets from sawdust, with said microwave pyrolysis being carried out in the presence of a catalyst, which, in turn, was obtained from biogenic feedstocks. However, the pyrolysis oils, which are obtained in this way, exhibit high levels of oxygen, in particular, in the form of sugars, guaiacols and phenols.

The publication, authored by J. Neumann et al. and released by the applicant in the Journal of Analytical and Applied Pyrolysis, vol. 113 (2013), p. 137, describes an intermediate pyrolysis of digestates. After completion of the pyrolysis, the products that are formed are fed to a reformer. However, this publication teaches neither the catalyst that is used in the reformer, nor the specific actions to be taken in order to generate pyrolysis oils of high quality.

Therefore, the object of the present invention is to improve the pyrolysis oils of the prior art and the method for their production and, in particular, to provide a method and an apparatus that is suitable for this purpose and with which pyrolysis oils, which lend themselves to use in motor vehicle engines, stationary engines and gas engines, can be obtained. Other objects are to improve the existing pyrolysis methods and the pyrolysis oils produced by such methods, with respect to the calorific value, viscosity, corrosivity, oxygen content, sulfur content and/or water content of the pyrolysis oils.

At least one of these engineering objects is achieved by means of the method for producing a pyrolysis oil and the pyrolysis oil and the system for carrying out the method in accordance with the independent claims. The dependent claims, the following description and the examples teach advantageous further developments.

A method for producing a pyrolysis oil comprises the following steps:

A) First, a feedstock that is to be treated is fed to a pyrolysis zone of a reactor, where it is pyrolyzed at a temperature ranging from 250 degrees Celsius to 700 degrees Celsius (measured temperature of the material on the inner surface of the reactor wall of the pyrolysis reactor); wherein the residence time of the material to be pyrolyzed in the pyrolysis zone ranges from 1 second to 1 hour. The material that is obtained at the end of the pyrolysis zone is called the "pyrolyzed material". The pyrolyzed material includes pyrolyzed solids and pyrolysis vapors.

B) Then at least the pyrolysis vapors are fed to a post-conditioning zone, in which the pyrolysis vapors are brought into contact with a catalyst bed at a temperature ranging from 450 degrees Celsius to 1,200 degrees Celsius; wherein (in addition to the non-condensable pyrolysis gases) the pyrolysis oil is formed. The catalyst that is used is a pyrolyzed solid as it is obtained by the process step A) described above. The catalyst may be used "in situ"; however, it is also possible to add a catalyst that has been produced independently of the method in accordance with the invention and that is obtainable by a method that comprises the above process step A).

C) Finally, the pyrolysis oil is separated from the other pyrolysis products, which are formed, in a separation unit. In particular, a separation of the pyrolysis oil from an aqueous phase, which is formed as well, can be carried out.

Therefore, process step A) can be a fast pyrolysis or an intermediate pyrolysis. In particular, the temperature of this pyrolysis ranges from 300 degrees Celsius to 600 degrees Celsius and often from 400 to 500 degrees Celsius. Basically the residence time may range, as explained, from 1 second to 1 hour, in particular, however, from 5 seconds to 30 minutes and, when carrying out an intermediate pyrolysis, often 3 minutes to 10 minutes.

The term "residence time in the pyrolysis zone" is defined in the context of the present patent application as the mean residence time of the fraction of solids that a solid (for example, a pellet) requires from the time that it enters the pyrolysis zone until it exits therefrom. In this case the beginning of the pyrolysis zone is defined by reaching the minimum pyrolysis temperature of 250 degrees Celsius in the pyrolysis material/feedstock; and the end of the pyrolysis zone forms the transition to the post-conditioning zone. This aspect is usually associated with the end of a means of transport that is used in the pyrolysis zone, for example, a screw conveyor. Finally, it is also the case that the end of the pyrolysis zone is reached, when the pyrolysis vapors are separated from the solids, in order to pass the vapors through a catalyst bed that is formed (or can be produced) from the pyrolyzed solids. In this case, the residence time in the pyrolysis zone is determined by means of a reference method in a true-to-scale Plexiglas cold model that simulates (in particular, with respect to any conveying means) the model of the invention, except for the materials, used to form the pyrolysis zone of the thermocatalytic system, and the heating apparatus. The "feedstock" that is used includes wood pellets of the size class D25 with a length of 20 mm to 30 mm. Then commercial wood pellets are passed through a cold model. After the entire pyrolysis zone is filled with wood pellets, a batch of 25 colored wood pellets is added; and the time that it takes for each of the individual colored pellets to pass from the entrance to the exit out of the pyrolysis zone is measured. The mean residence time can be measured directly by eye (in particular, if this is possible due to the ratio of the reactor diameter and the pellet size). In larger reactors (which do not permit a purely visual detection) or if the preparation of a Plexiglas model is too complicated, the residence time can also be determined directly at the reactor by measuring the time that is needed by each individual pellet to enter into the reactor up to the time it exits the pyrolysis zone, and the (constant) passage time through any other areas of the system that may be arranged upstream of the pyrolysis zone is subtracted. The mean residence time $\bar{t}$ is calculated as the quotient obtained by dividing the sum of the residence times $t_i$ by the number of colored pellets, where in this case the said reference method is run twice:

$$\bar{t} = \frac{\sum_{i=1}^{n} t_i}{n}$$

According to one embodiment, the pyrolysis zone for the method of the invention may be designed in the manner of a multi-stage screw reactor or a rotary tubular reactor. In more general terms, the pyrolysis zone usually has conveying means for transporting the feedstock or, more specifically, the pyrolysis material, where in this respect, in particular, screw conveyors, conveyor spirals and/or belt conveyors should be mentioned.

However, the pyrolysis step A), which, in principle, can be carried out with any fast or intermediate pyrolysis, as can be inferred from the above explanations, is not essential for the formation of the high quality pyrolysis oil of the invention, but rather the post-conditioning step B). This post-conditioning step is also called reforming due to the refinement of the pyrolysis vapors. The reforming of the pyrolysis vapors takes place by bringing into contact with a catalyst bed, wherein the catalyst can be obtained with the above pyrolysis step A). Thereby, the pyrolysis vapors can be brought into contact with the catalyst bed in any way. The pyrolysis vapors can be passed over the catalyst bed; and the contact can also take place in a fluidized bed. In many cases it has proved to be advantageous to pass the pyrolysis vapors through the bed, since then it is possible to make an extremely intensive contact. The post-conditioning respectively the reforming is carried out at a temperature ranging from 450 degrees Celsius to 1,200 degrees Celsius, in particular, 500 to 800 degrees Celsius and often from 600 to 700 degrees Celsius. Temperatures above approximately 700 to 750 degrees Celsius are often less advantageous in terms of cost, while temperatures below 500 degrees Celsius often lead to products of lower quality. Particularly high-quality products can be obtained for most feedstocks in the temperature range of 650 to 750 degrees Celsius. When the catalyst, which is used in step B), is not produced directly in the process (or, more specifically, "in situ") from the feedstock that is used, but rather is fed to the post-conditioning zone from another source, then in the meantime the catalyst should not be subjected to any oxidizing conditions or at most only briefly, in particular, in the form of atmospheric oxygen, so that its catalytic activity is not reduced.

As a rule, the method, according to the invention, is carried out in such a way that the temperature of the post-conditioning in step B) is higher than that of the pyrolysis in step A). Normally the temperature will be no less than 50 degrees Celsius higher, often no less than 100 degrees Celsius higher. The reason lies in the fact that, in most cases, the quality of the pyrolysis oils that are formed, when carrying out the reforming in accordance with step B), is improved at temperatures exceeding 600 degrees Celsius, while the pyrolysis according to step A) is often carried out, if only for economic reasons, at temperatures that are no less than 100 degrees Celsius below this value. In the individual case, in particular, when using continuously operated fixed bed reactors, in which the pyrolysis zone and the post-conditioning zone merge seamlessly into each other, the temperature in step A) and step B) may also be about the same and range, for example, from 600 to 650 degrees Celsius.

The high quality pyrolysis oil, described in more detail below, can be produced with the method described above and, in particular, in a quality that could not be obtained to date from the prior art.

Without wishing to be restricted thereto, this feature is explained, in particular, by the deoxygenation of the pyrolysis vapors that takes place during step B). The oils, which are obtained, have a lower oxygen content, a high calorific value, a low viscosity, a low acid value and a low water content. Furthermore, they can be distilled without decomposing to a large extent and also have no aging effects, like the pyrolysis oils according to the prior art.

It goes without saying that the method, according to the present invention, may have, in addition to the two steps A) and B), other steps, in particular, a pre-conditioning, in which the feedstock is already heated to a temperature that is below that of the pyrolysis zone in step A). In addition, it is, of course, possible to carry out other post-conditioning steps, for example, post-conditioning steps with other catalysts or without catalysts at elevated temperatures or also hydrogenation with the hydrogen gas or synthesis gas that is also obtained in the pyrolysis. Furthermore, in the case of feedstocks, which lead to a higher water content in the pyrolysis oil, the water content of the pyrolysis oil can also be decreased by means of methods that are known to the person skilled in the art, for example, from the production of biodiesel. Last, but not least, post-conditioning of the pyrolysis oil that is obtained can also take place by means of distillation or fractionated condensation. An additional post-conditioning makes it possible, in particular, to further decrease the oxygen content, the viscosity, and the acid value and to further increase the calorific value. However, as already stated above, in particular, the post-conditioning step B) is essential for the quality of the resulting pyrolysis oils.

According to one embodiment, the pyrolysis oils that are obtained in step C) are fed to a distillation unit. Frequently this distillation is carried out at a reduced pressure, for example, at less than 200 hPa. Normally the sulfur content can also be lowered through distillation; and the acid value can be further reduced. In addition, an oil having a much lower viscosity is also obtained due to the separation of the heavy oils and the like.

According to an additional embodiment, the pyrolysis products that are obtained after step B) or C) are fed to a hydrogenation step (or hydrodeoxygenation), in particular, catalytic hydrogenation. The reactors, the reaction conditions and the catalysts that are required for this purpose are known to the person skilled in the art. Hydrogenation makes it possible to reduce the sulfur content and the acid value to a considerable extent. Even the oxygen content, the nitrogen content and the water content are significantly reduced.

According to one embodiment, the materials that are at least partially biogenic are used as the feedstocks, because then the method of the invention can show its advantages especially well. Frequently materials that are more or less completely biogenic are used, in particular, against the background of producing bio-based fuels. Furthermore, the biogenic feedstocks lend themselves particularly well to the production of the catalysts that are used in the process step B). The term "biogenic" should be construed to mean in this context that the feedstock is essentially of "biological or organic origin". Thus, the term does not encompass any material of chemically synthesized origin. Therefore, the term encompasses, in particular, feedstocks that are formed primarily by plants, animals or microorganisms.

However, non-biogenic material may also be used to recover high quality pyrolysis oils, and in this case one advantage of the method, according to the invention, comes into effect, even when these feedstocks are acidic or contain acid forming constituents in the pyrolysis, since the post-conditioning of the method, according to the invention, allows the level of acidity of the pyrolysis oil to be significantly reduced.

Examples of biogenic feedstocks that can be used include not only the digestates (in particular, from biogas and bioethanol processes), which have already been mentioned in the prior art, but also other biogenic feedstocks, especially since the use of digestates usually produces a very high water content in the pyrolysis oil, an aspect that is probably due to the high fraction of oxo compounds in the pyrolysis oil. Examples of "other biogenic feedstocks" include, in particular: cellulose-containing materials (in particular, waste wood, agricultural waste and straw), industrial biomass residues (in particular, digestates, brewer's spent grain, grape pomace, olive pomace, nut shells or coffee grounds), spent grease and animal fat, which is not released for consumption or the production of animal feed, slurries from the recycling of paper and manure-containing materials and sewage sludge. It goes without saying that mixtures of these materials can also be used with each other as a feedstock or mixtures of said materials with other biogenic materials, with digestates or non-biogenic substances. However, it is also possible to use inseparable mixtures of biogenic and non-biogenic materials, such as, for example, in the case of used baby diapers or the rejects, generated in paper recycling.

Last, but not least, polymers can also be used as feedstocks, which in most cases can not be called biogenic. Some examples that can be mentioned here include, in particular, polyacrylates, polyurethanes, polyesters, polyolefins and rubber (which is generated, for example, in large amounts in the form of old tires). In this case, too, it goes without saying that these materials may also be mixed with one another or with other materials. However, no halogen-containing, non-biogenic feedstocks and, in particular, no chlorine-containing, non-biogenic feedstocks are used according to the invention. In particular, the non-biogenic feedstocks are often mixed with biogenic feedstocks, since then in any case a catalyst, with which the advantageous pyrolysis oils of the invention are formed, is produced "in situ". However, as already mentioned above, the catalyst for the method, according to the invention, may also be fed to the reforming zone from another source.

According to another embodiment, the feedstock has an ash content of no less than 0.5% by wt., in particular, no less than 5% by wt. and often no less than 8% by wt. In this case the ash content is determined in accordance with DIN EN 14775, however, at 815 degrees Celsius. It has been found that as the ash content of the feedstock that is used increases, the ash content of the pyrolyzed residual substance that is used as the catalyst also increases. It should be noted that it has no effect or at least no significant effect on the ash content of the pyrolysis oil that is formed and that it is very low in any case. If at this point such a catalyst is used, then it should be noted, in turn, that (at least at ash contents of the feedstock of up to 15% by wt.) the amount of hydrogen produced (contained in the pyrolysis gas that is formed) usually increases as the ash content of the catalyst increases. In addition, however, an increasing ash content also leads, as a rule, to a higher quality of the pyrolysis oil that is formed, in particular, as regards the level of acidity of the pyrolysis oil.

As a result, catalysts with a high ash content are useful in the post-conditioning step B), especially if substances are used as the feedstocks that have an elevated content of acids or in the pyrolysis an increased fraction of acids. In principle, however, it is also conceivable to use at the same time a catalyst, which was formed from a feedstock having an ash content of less than 1% by wt., for example, when feedstocks are pyrolyzed and reformed, that even without the reforming already lead to pyrolysis oils with relatively low levels of acid, as is the case, for example, with paper slurries that have only a relatively small fraction of lignocellulose.

However, the catalyst that is used, according to the invention, in process step B) does not necessarily have to be produced with the process step A). Instead, it can regarding the catalytic properties also be designed to simulate such a catalyst, in particular, regarding the catalytic properties that can also be induced by the ash constituent. For example, pyrolysis coke without ash constituents can also be subsequently treated with the chemical compounds, contained in the ash constituent, where in this case the ash constituent relates to a pyrolyzed solid that is obtained from a given feedstock in step A) of the invention.

According to another embodiment, the feedstocks are chosen in such a way that at least one of the following chemical elements is contained: zinc, iron, platinum, rhenium, chromium, copper, manganese, nickel, titanium, aluminum, silicon. Said element does not have to be present in the elemental form; it can also be present in ionic form or in bound form (for example, as an oxidic compound or in the form of a complex). Such metals are usually contained, for example, in manure and the like, perhaps because they are trace elements or are fed to the material cycle in a different form. However, due to the specific conditions of production, in which certain waste materials are obtained, said metals can be introduced into the waste materials, for example, copper from copper kettles. It has been recognized in accordance with the invention that, especially in the case of the aforementioned metals, an outstanding catalytic effect of the solid pyrolysis product as the catalyst take place. In order to ensure this effect, the biomass that does not contain these metals, even a biomass with high metal fractions, such as manure, may be added, in order to ensure an especially efficient process management. In addition, however, the metal can be added to the feedstock in small amounts, in particular, from waste materials (and here again non-biological waste materials).

According to one embodiment, a material having a humidity content of more than 10% by wt. is used as the feedstock. It is even possible to use a material having a moisture content of up to 25% by wt.; also a material with a moisture content of up to 40% by wt. can be used. However, the method according to the invention provides so many valuable pyrolysis products that it is possible to pre-dry the moister feedstocks, in addition to running the heating means of the system, according to the invention, through the thermal use of the pyrolysis products. The high water contents are possible according to the invention because in the framework of the intermediate pyrolysis that is used, in particular, due to the homogeneous and heterogeneous water-gas shift reaction and the steam reforming, the water from the feedstock can be consumed, and hydrogen can be formed. At this point the method of the invention is generally characterized, in particular, by the feature that, owing to the catalytic activity of the solid pyrolysis products, it is precisely this hydrogen that is formed to a greater extent. As a result, feedstocks with much higher water contents than those in the prior art can be used and are even highly useful for the method according to the present invention. In contrast, there is a natural limit of 25% by wt. of water, for example, in slow pyrolysis; in the case of flash pyrolysis a water content of less than 10% by wt. or intensive pre-drying of the feedstock is usually necessary.

Since the method, according to the invention, can exhibit its particular advantages, when the acid value of the pyrolysis oil that is formed (compared to a pyrolysis oil that is obtained without reforming) can be significantly reduced, the feedstock is selected in accordance with another embodiment in such a way that it contains acids or forms acids during the pyrolysis. In this case, too, acids that can be mentioned include, in particular, carboxylic acids that, compared to other organic acids, such as phenolic acids, typically have significantly more corrosive properties. In principle, however, in order to obtain an advantageous pyrolysis oil, it is possible to prepare a feedstock that is composed of a mixture of various materials containing varying levels of acid in order not to obtain after step B), nevertheless, pyrolysis oils with a relatively high level of acidity, since in step B) the acid value is indeed significantly reduced, but a residual level of acidity remains. For example, it is possible to add, for instance, in the case of digestates and at lower reforming temperatures, paper slurries or polyolefins that usually have only a very low level of acidity.

According to another embodiment, the feedstock has a fraction of lignocellulose. This lignocellulosic fraction may even be up to 100% in the method of the invention, because the acids that are formed are only more or less intermediary. If lignocellulose is contained in the feedstock, then its share of the biogenic fraction of the feedstock, but often of the total feedstock, may be more than 5% by wt., in particular, more than 10% by wt. Since the lignocellulose leads to more acid being formed during the pyrolysis in step A), usually no pyrolysis oil that is suitable as fuel for motor vehicles can be obtained according to the method of the prior art at higher lignocellulosic fractions. In the present method the situation is different: In any case, here it is possible, according to the present invention, to obtain with lignocellulosic fractions exceeding 15% by wt. and, in particular, also with fractions exceeding 30% by wt. very good pyrolysis oils, with which, according to the prior art, unusable pyrolysis oils are obtained for the aforementioned purposes.

The pyrolysis in step A) can be carried out, as explained, with a number of different pyrolysis methods. However, in order to obtain an especially high yield of pyrolysis oil, the pyrolysis should be carried out in such a way that the organic feedstocks are cracked into the smallest possible fragments, because, in particular, long-chain fragments lead to the formation of tar; and small fragments may cause a reduction in the viscosity of the pyrolysis oil. Therefore, according to one embodiment, the pyrolysis may take place in such a way that the material passing through the pyrolysis zone is continuously fed back by recirculation means into the region of the pyrolysis zone that faces away from the post-conditioning zone. Thereby, up to a certain degree a catalytic treatment of the pyrolyzed material, in particular, in the form of cracking processes, takes place then as early as in the pyrolysis zone, said catalytic treatment usually taking place at lower temperatures than in step B) of the present patent application. The result of such cracking processes is a lower viscosity of the pyrolysis oil that is formed. In this context the recirculation means may be, in particular, back mixing screw elements, counter-rotating screw elements or recirculation rods in the reactor of the pyrolysis zone or recycling hooks and the like. A key factor here is, in particular, that a "counter-conveyance movement," can be realized using these recirculation means, so that either a sub stream of the material flows, present in the pyrolysis zone, can be continuously guided upstream or that in a mode with two operating states, an upstream transport of the pyrolysis product flow can occur in at least one of the two operating states. A more detailed explanation of the way, in which the material passing through the pyrolysis zone can be continuously fed back by the recirculation means into the region of the pyrolysis zone that faces away from the post-conditioning zone may be found in the published document WO 2015/158732 A1. The features of the recycling means and the pyrolysis zone that are described in said published document are hereby incorporated by reference in their entirety.

According to an additional embodiment, the process step B) is carried out in such a way that the residence time of the pyrolysis vapors in the post-conditioning zone ranges from $10^{-3}$ seconds to 3 minutes, in particular, 0.1 to 120 seconds, often 1 to 60 seconds, for example, 5 to 20 seconds. In this case the residence time in the post-conditioning zone is determined, in turn, by a reference method, wherein colored vapor is used as the "pyrolysis vapor" to be reformed. The residence time (or more specifically, the mean residence time) is then the time that elapses between entering into the catalyst bed and exiting at the end of the catalyst bed until at the end of the catalyst bed the escaping gas has undergone a color change that corresponds to a concentration that is half as large as that of the colored gas fed in to the catalyst bed.

Therefore, the lower limit of the residence times is particularly relevant, because otherwise no sufficient reforming takes place. If, however, the residence time is too long, then the cracking of the materials contained in the pyrolysis vapors goes too far, so that although in the end a higher increase in the hydrogen content of the product range is achieved, only a low yield of pyrolysis oil is still achieved. In addition, higher polycyclic aromatic hydrocarbons (PAH), which promote, in addition to their toxicity, the formation of soot in diesel engines and are, therefore, undesirable, form, in particular, at residence times of more than 120 seconds and in most cases even as early as at more than 60 seconds (in particular, when at the same time a temperature of more than 600 degrees Celsius is selected for the post-conditioning step). At residence times ranging from 5 to 20 seconds, the formation of PAHs is largely suppressed; and at the same time a very large yield of pyrolysis oils of a very high quality is obtained.

The specific temperature profile and the specific choice of the residence time of the pyrolysis vapors in the reforming step, in particular, as described in the preceding paragraph, make it possible for a selective formation of the desired product compounds to take place. In particular, the temperature profile is adapted in this case to the respective biomass. For example, for the paper slurries that are used relatively low temperatures in the range of 500 deg C. and for the olive pomace that is used relatively higher temperatures in the range of 700 degrees Celsius have been found to be especially suitable. In general, the concentration of oxo compounds and polar compounds, such as, for example, aldehydes and ketones, is significantly reduced by reforming. Due to the smaller amount of oxo compounds even the solubility of water in the pyrolysis oil, which is obtained after the reforming, as well as the solubility of the components of this pyrolysis oil in water are usually decreased. This feature makes it possible to improve the separation of the aqueous phase and the oily phase of the liquid products that are obtained after the reforming. Moreover, a high oxygen content or rather a high content of oxo compounds in the pyrolysis is negative, since it is expensive to dispose of the process water that is contaminated with organics, and also the yield of pyrolysis oil is reduced.

It was observed in accordance with the invention that dominantly alkanes and alkenes are formed when post-conditioning at about 500 degrees Celsius. By increasing the temperature to no less than 600 degrees Celsius and, in particular, to more than 700 degrees Celsius, less alkanes and alkenes are formed, whereas more and more aromatic hydrocarbons, such as alkylbenzenes, naphthalenes, styrenes and indoles are usually formed. Therefore, the choice of a reforming temperature of more than 600 degrees Celsius or more than 700 degrees Celsius is also useful, if the pyrolysis oil that is formed is used in or as fuel(s). Aromatic hydrocarbons and, here, in particular, alkylbenzenes are desirable as anti-knock agents in gasoline. In this case alkylbenzenes are used as a non-toxic benzene substitute. Naphthalenes and indoles are also commercial fuel additives and have a positive effect on the quality of the fuel.

According to a typical embodiment, both the pyrolysis and the reforming take place in essence at atmospheric pressure (1,013 hPa). However, the pressure may be higher, for example, by more than 200 hPa or even higher by more than 1,000 hPa. In the specific case there may also be pressure levels that are even much higher. The amount of pressure may also vary in the different regions, for example, in order to be able to control a feed inside the reactor. Furthermore, the separation of the pyrolysis products can be carried out at a higher pressure level, so that hydrocarbons and other organic products can be separated from the hydrogen, carbon dioxide and carbon monoxide that are formed just as well, based on just the pressure profile alone.

According to an additional embodiment, the residence time of the catalyst in the post-conditioning zone is at most 12 hours, in particular, 10 minutes to 6 hours, in step B). Typically the residence time ranges from about 30 minutes to 5 hours. In particular, the catalyst that is used in this case is a catalyst that has not been used yet for the post-conditioning according to the present patent application. Particularly suitable for this purpose is a fresh catalyst, which is formed in step A) and which can be used for the reforming step immediately after the formation in step A).

In this case the method is often carried out in such a way that first the pyrolyzed solid that is formed by means of the pyrolysis step is fed to the reforming zone in its entirety, i.e., is used entirely for step B). Therefore, the residence time, defined in the preceding paragraph, is defined in such a way that it is based on the use of the whole solid as a catalyst in step B) and the pyrolysis vapors, which are brought into full contact with this catalyst and are formed in step A). Although the residence time is basically independent of the amount of feedstock that is supplied and the duration of the pyrolysis step and the pyrolysis vapors, which are formed from the feedstock, and the pyrolyzed solids, which are newly fed to the reformer. Nevertheless, a general value for the residence time based on the pyrolysis vapors shall be given below, especially since this value is also applicable when the pyrolyzed solid is not fed in its entirety to the reforming zone. Then the aforementioned values relate to a throughput of about 3,000 liters of pyrolysis vapor per liter of catalyst per hour.

The lower limit of 10 or 30 minutes, respectively, for the residence time of the catalyst in the post-conditioning zone was selected, because for most of the feedstocks a significant effect of the catalyst is observed after 10 minutes. Over time the activity of the pyrolyzed solid, which is in continuous contact with the pyrolysis vapors, decreases. Without wishing to be restricted thereto, this phenomenon is explained scientifically by the fact that (due to the reaction of the pyrolysis vapors taking place on the surface of the solid) mesopores, which are formed during the pyrolysis, grow into macropores in the reforming step; and the surface of the solid is coked due to the reforming, as a result of which the reactive surface is significantly reduced. Therefore, as a rule, the pyrolysis solid must be regarded as a consumption catalyst, which provides a high activity only within a certain residence time. Therefore, the aforementioned upper limit for the residence time of the catalyst is due to its decreasing activity. However, it should be noted in general that the residence time to be set in the specific case is highly dependent on the biomass that is employed for the catalyst that is used, the temperature profile of the reforming and the amount of vapors, which are to be reformed and which flow through the catalyst, so that the aforementioned values encompass a relatively large timespan.

In a continuously operated reforming step B) the residence time is also affected by the maximum filling level of the reforming reactor. Usually in order to exploit the activity of the catalyst as far as possible, the maximum possible degree of filling will be achieved (a fill of no less than 50% should be useful in this case); in the continuous operation, upon reaching the desired fill level, the spent reforming catalyst is then discharged from the reforming zone to the same extent that such a pyrolyzed solid is fed to the reforming zone.

In order to enable a contact with the pyrolysis vapors that is as efficient as possible, the pyrolysis vapors, which are formed in step A), are fed, according to an additional embodiment, to the post-conditioning zone in such a way that the volume flow of the pyrolysis vapors is passed more or less completely through the flow paths in the catalyst bed. Therefore, the reforming zone is formed in such a way that the pyrolysis vapors must not only sweep over the catalyst bed, but they must completely penetrate it. In particular, the catalyst bed is arranged in the post-conditioning zone in such a way that there is a cross sectional area of the post-conditioning zone that is arranged perpendicular to the direction of flow and is more or less completely filled with the catalyst bed. As a result, the aforementioned residence times of the pyrolysis vapors in the reforming zone or the post-conditioning zone are also specified based on such a complete filling. In this case the underlying geometry of the reforming reactor or, more specifically, the reforming zone is based on the standard guidelines for the design of the tank so that normally a length to diameter ratio of 0.5 to 15 will be achieved.

According to another embodiment, the volume flow of the pyrolysis vapors is passed through the catalyst bed in such a way that the pyrolysis vapors also come into contact with the catalyst, which is held the longest in the reforming zone, only at the end of the process step B). Therefore, the pyrolysis vapors make initial contact with the solid that was just fed to the pyrolysis zone and that should also have, according to the theory explained above, the highest activity. Then the pyrolysis vapors will gradually make contact with the solids, which are catalytically increasingly less active, until eventually contact is also made with those solids that are about to be discharged. If only for economic reasons, the pyrolyzed solids, which have been just freshly formed in step A), will often be supplied for the freshly supplied catalyst. At least in the case of continuous processes it will also be arranged that, as a rule, the feed of the pyrolyzed solid or, more specifically, the reforming catalyst to the reforming zone will be continuous.

The above defined objects of the invention are also achieved (at least partially) by means of the pyrolysis oils that can be obtained with the method, described above.

A pyrolysis oil in accordance with the invention is characterized by a carbon content that is greater than or equal to 65% by wt., a hydrogen content that is greater than or equal to 5% by wt. and an oxygen content that is less than or equal to 16% by wt. Furthermore, the pyrolysis oil has an acid value of less than or equal to 15 mg of KOH/g and a $^{14}C$ content of no less than 0.1 parts per trillion (measured according to the method by Libby by means of a counter tube).

Thus, the oil is characterized by a relatively low oxygen content in relation to the carbon content and a relatively high hydrogen content in relation to the carbon content. Furthermore, the acid value is relatively low. Due to the use of biogenic feedstocks, a significant fraction of the $^{14}C$ atoms can be detected. While for fossil oils the $^{14}C$ content is 0 or close to 0, the $^{14}C$ value for purely biogenic feedstocks is approximately 1 parts per trillion. Since a significant fraction of the pyrolysis oils of the invention was usually obtained from biogenic feedstocks, there are accordingly a significant fraction of $^{14}C$ atoms that in the case of the pyrolysis oils, obtained from purely biogenic feedstocks, is, in particular, greater than 0.8 parts per trillion and often also greater than 0.9 parts per trillion. In the case of blends with synthetic materials or with the addition of fossil liquids in a quenching process, the aforementioned values of 0.8 and 0.9 parts per trillion should be reduced accordingly (with the factor of reduction being the result of the fraction of non-biogenic materials in the feedstock or the added fossil liquids).

With respect to the percentage by weight of carbon, hydrogen and oxygen as well as other chemical elements, as specified according to the invention, it should be noted that said percentage by weight relates (unless explicitly stated otherwise), as a function of the standard measurement methods, only to the weight of the organic components of the pyrolysis oil and the ash; as a result, the water contained in the pyrolysis water is not considered.

According to one embodiment, the pyrolysis oil has an acid value of <10 mg of KOH/g, in particular, an acid value of <6 mg of KOH/g. Such pyrolysis oils are obtained, especially when the step B), described above, is carried out at temperatures in the range between 600 and 750 degrees Celsius, at which pyrolysis oils of a higher quality are generally obtained. Hence, the examples also show throughout that acid values of less than 6 mg of KOH/g, and usually even less than 5 mg of KOH/g are obtained at reforming temperatures greater than 630 degrees Celsius.

Depending on the feedstock of the process described above, the composition of the pyrolysis oil in terms of the chemical elements can be specified in even more detail.

For most feedstocks pyrolysis oils are obtained, in which the oxygen content of ("anhydrous") pyrolysis oil is much less than 16% by wt. Normally the oxygen content is less than 8% by wt.; in only one instance (grape pomace) was a much higher oxygen value measured. Frequently the oxygen content is even less than 5.5% by wt. This ratio of oxygen to carbon (i.e., the quotient of the oxygen content and the carbon content in each case in % by wt.) is usually less than 0.15 and is usually also less than 0.12. In many cases even a ratio of less than 0.1 is determined.

In contrast, the weight ratio of hydrogen to carbon is often greater than 0.08, in particular, greater than 0.10, and often also greater than 0.11.

As a result, it can be stated that most pyrolysis oils, which can be produced with the method, according to the invention, have a carbon content greater than 75% by wt., a hydrogen content of 6 to 11% by wt. and an oxygen content of up to 9% by wt., often from 3 to 6.5% by wt. Furthermore, the nitrogen content is usually 1.5 to 4.5% by wt., which in the case of sewage sludge, however, can also be above 8% by wt.

As stated above, the pyrolysis oil is also usually characterized by the feature that the water content is very low. Typically the water content is less than 5% by wt. and in most cases also less than 3% by wt.; often even water contents of less than 2% by wt. were detected. However, when using digestates and grape pomace as the feedstock, much higher water contents are observed; however, they can be significantly reduced by means of an optimized phase separation process. In addition, a water content greater than 10% by wt. or even greater than 20% can also be reduced by a method, which is used industrially in the production of biodiesel or crude oil, and, in particular, to the aforementioned water contents of less than 5% by wt. or even less than 3% by wt.

As an alternative or in addition to the radiocarbon dating method, the biogenic origin of the pyrolysis oils can also be reconstructed by gas chromatographic methods. In many cases one or more of the following chemical compounds can be detected by means of GC-MS in amounts of more than 0.1% by wt.: 1H-pyrrole, 1-methylpyridine, 2,3-dimethylpyrazine, 2,6-dimethyl-1H-indole, thiophene, 2-methylthiophene, 3-methylthiophene. As an alternative or in addition, the absence of certain classes of compounds can also be used. As already explained above, there are frequently large fractions of sugars, guaiacols and the like in the pyrolysis oils, when feedstocks containing lignocellulose are used according to the prior art. If such feedstocks are used in the processes according to the present invention, then pyrolysis oils are obtained, in which the GC-MS-determined content of sugars, guaiacols (methoxyphenols) and also syringols (dimethoxyphenols) is in each case less than 0.1% by wt. and usually less than 0.01% by wt.

Finally, the pyrolysis oils that are obtained have a relatively high fraction of aromatic hydrocarbons, in particular, benzene, toluene and xylenes, as well as derivatives thereof, which is typically greater than 5% by wt., and in most cases greater than 8% by wt., frequently even greater than 16% by wt., and often greater than 20% by wt. (determined by GC-MS). The aromatics content can be influenced by means of the temperature profile of the after-treatment step. At suitably high reforming temperatures and not too long residence times, a significant fraction of alkylbenzenes, naphthalenes, styrenes and indoles is formed, as explained above. Furthermore, the fraction of aromatics can be increased even further in an advantageous way by subjecting the pyrolysis oil, which is obtained, to distillation.

Normally the pyrolysis oil also includes polycyclic aromatic hydrocarbons (PAHs), the fraction of which should not be too high, especially when the pyrolysis oils are used as fuel or a fuel additive; and, for example, for diesel fuel the fraction should not exceed about 8% by wt. Given a suitable reaction regime, this limit value can be met without any problems. As a rule, PAH contents of less than 8% by wt. are achieved by means of a residence time of the pyrolysis vapors of a maximum of 60 seconds in the reforming zone at 600 degrees Celsius or higher temperatures. In almost all cases these values are reached at a residence time of the pyrolysis vapors of a maximum of 20 seconds in the reforming zone at reforming temperatures between 600 degrees Celsius and 700 degrees Celsius. Even at longer residence times the PAH content is usually not more than 10 to 15% by wt. and can be reduced, if desired, by distillation.

Finally the pyrolysis oils of the invention also have a high calorific value, which is typically, regardless of the feedstocks, greater than 20 MJ/kg and in most cases also greater than 30 MJ/kg.

All of the characteristic parameters, listed above, refer (unless explicitly stated otherwise) to pyrolysis oils that have not been subjected to any additional after-treatment, in particular, any catalytic hydrogenation or any distillation. Instead, the said parameters relate to pyrolysis oils that were subjected to a subsequent after-treatment only by means of the process step B), which was explained in detail.

The pyrolysis oils of the invention are also distinguished by the fact that they are distilled without decomposing to a large extent. The distillability is determined by means of vacuum distillation (glass piston assembly) at 100 hPa (abs). In this case no less than 50% by wt., in many cases no less than 80% by wt. of the pyrolysis oil of the invention can be distilled without decomposing. During distillation of the pyrolysis oils of the invention heavy oil and phenolic resins remain as the residue.

Additional distillation causes, in particular, the oxygen content of the pyrolysis oil to decrease, while the weight ratio of hydrogen to carbon remains almost the same. Therefore, the pyrolysis oils that are obtained by additional distillation normally have an acid value of <5 mg of KOH/g, and (depending on the feedstock) an oxygen content of less than 8% by wt.

Not only is the pyrolysis oil detected in the pyrolysis gas, but also a high hydrogen content. This hydrogen can be used to further refine the pyrolysis oils of the invention and to further deoxygenate them. As already stated above, the formation of hydrogen is highly dependent on the ash content of the catalyst that is formed. At ash contents of up to 10% by wt. the hydrogen contents of normally no less than 15% by wt., often 20 to 35% by wt. are obtained in the pyrolysis gas. At ash contents exceeding 10% by wt. hydrogen contents of normally no less than 30% by wt., often 35 to 45% by wt. are obtained in the pyrolysis gas. The hydrogen gas can be used for, among other things, the catalytic hydrogenation of the pyrolysis oils and, thus, for further refinement of the pyrolysis gas.

Catalytic hydrogenation of the pyrolysis oils of the invention can be carried out, as the person skilled in the art knows, in particular, by means of heterogeneous catalysis. Particularly good results are obtained when the hydrogenation takes place at a significantly elevated pressure. Owing to an additional hydrogenation, in particular, the oxygen content (and the content of other hetero atoms, in particular, the sulfur content) of the pyrolysis oil is greatly reduced, while the weight ratio of hydrogen to carbon and the hydrogen content are increased. Therefore, the pyrolysis oils that are obtained after (additional) hydrogenation generally exhibit an acid value of <0.1 mg of KOH/g and an oxygen content of less than 1% by wt. Furthermore, in many cases the carbon content is greater than 80% by wt.; the hydrogen content is greater than 10% by wt.; and the sulfur content is less than 0.002% by wt.

In summary, it can be stated that by the method according to the invention, for the first time, pyrolysis oils can be produced, which have a very high calorific value, a low water content, a low acid value, a low viscosity, a high content of benzene, toluene and xylene, a high thermal stability, a low oxygen content, a low content of oligophenols, a good distillability and finally, because of the low ash content of usually less than 0.25% by wt. (measured at 815 degrees Celsius) and often also 0.2% by wt. or less, a negligible formation of aerosols. Compared to the pyrolysis oils of the prior art, the oxygen content is much smaller. In the case of a non-hydrogenated pyrolysis oil of the present invention the said oxygen content is in the range of the hydrogenated pyrolysis oils of the prior art. If the pyrolysis oils of the present invention are also hydrogenated in addition, then not only the oxygen content can be further reduced, but also the hydrogen/carbon ratio can be increased to a value that (for a given feedstock) has not been achieved by the prior art.

Therefore, owing to their advantageous properties the pyrolysis oils of the present invention can be used to run engines that cannot be operated with the pyrolysis oils of the prior art. Some examples that can be mentioned here include engine-based cogeneration plants or spark ignition engines; in general, any engine that is used for motor vehicles and the like. However, the pyrolysis oils can also be mixed with non-biogenic fuels to attain fuels that are obtained to some extent from biogenic materials.

Last, but not least, the above defined engineering objects of the invention are achieved (at least partially) by means of the system that is used for the method described above.

According to the invention, a system for the recovery of pyrolysis oil from a feedstock by means of a thermocatalytic treatment comprises at least one charging area for supplying the feedstock to be treated, a pyrolysis zone, in which the pyrolysis vapors and the pyrolyzed solids are formed from the feedstock, and a post-conditioning zone, in which the pyrolysis vapors are passed through a catalyst bed, wherein reformed pyrolysis vapors are obtained, and a separation unit for separating the pyrolyzed material. In this context means are provided that effect the full flow of the pyrolysis vapors through the catalyst bed in the post-conditioning.

Additional embodiments of the system will be apparent from the method described in more detail above and below.

The invention is described in more detail below in conjunction with an exemplary process sequence.

A biogenic feedstock is fed to a pyrolysis reactor that is designed as a screw reactor. At the same time the feedstock is heated to a temperature ranging from 300 to 600 degrees Celsius, in particular, 400 to 450 degrees Celsius. At this temperature the pyrolysis takes place, taking care to ensure that the pyrolysis is carried out in the absence of oxygen or at least in a significantly reduced oxygen atmosphere. The usual residence times of the material to be pyrolyzed in the pyrolysis reactor range from 3 to 10 minutes. For example, digestate can be used as the biogenic feedstock and can remain for 7 minutes in the pyrolysis zone. The material is heated in three zones, where in the first zone 200 degrees Celsius are reached (therefore, this is not yet a part of the pyrolysis zone in the context of the present invention, but rather should be seen as the pre-conditioning zone); in a second zone the material is heated to 350 degrees Celsius; and in a third zone it is heated to 400 degrees Celsius. Pyrolysis coke and pyrolysis vapors are obtained by pyrolysis. The pyrolysis vapors contain large fractions of carboxylic acids, syringols, guaiacols and oligophenols.

Subsequently, the materials, which are obtained in the pyrolysis step, are fed to the post-conditioning zone respectively the reforming. This can be done in a continuous tubular reactor. However, a separate reforming reactor may also be used. The reforming step can be carried out by means of a batch reactor or by means of a continuously operating reactor. Thus, the pyrolysis coke that is formed in the pyrolysis step is fed to the reforming part of the reactor, where it is heated to 500 to 800 degrees Celsius. The pyrolysis vapors that are formed in the pyrolysis reactor are subsequently sucked through the hot bed of pyrolysis coke due to the reactor-specific construction. Here, the post-conditioning zone can have a 7 liter capacity; and about half of this post-conditioning zone can be filled on average with the pyrolysis coke or, more specifically, the catalyst, wherein the geometric relationships from FIG. 1 form the basis. Here, the residence time of the pyrolysis vapor ranges generally from 1 to 20 seconds; the residence time of the catalyst ranges generally from 3 to 4 hours. In the method that has already been mentioned above as an example, the digestate can be used to heat the pyrolysis coke, which is produced, to 700 degrees Celsius in the reformer part; and a residence time of the pyrolysis vapors in the reformer part of about 5 seconds can be achieved. The pyrolysis vapors are converted in the coke bed, with the carboxylic acid being destroyed and the pyrolysis tars being cracked. Furthermore, syringols and guaiacols are decomposed into benzene components. The pyrolysis condensate that is formed spontaneously forms an aqueous phase and an organic phase. The organic phase is referred to as the pyrolysis oil in the context of the present patent application. For a continuous process, in which a feedstock having a high content of biogenic ingredients is used continuously, the pyrolysis coke that is formed during pyrolysis is continuously fed to the reforming part of the reactor, and the catalyst, which is already contained in said reforming part and is used for reforming, is exchanged. However, it is also conceivable, in principle, as explained above, to use the pyrolysis coke that is formed for a longer period of time and to exchange again only at longer intervals. Finally, the separation of the condensable and non-condensable fractions is carried out in a separation step; in the case of the condensable fractions the pyrolysis oil in turn is separated from the aqueous phase that is formed just as well.

FIG. 1 shows a true-to-scale diagram of a reforming reactor, which is used in accordance with the present invention and which can also form a subzone of a larger reactor. The reactor comprises a larger tube 21, which is completely filled with the solid, which is formed during the pyrolysis, or, more specifically, the catalyst. The tube 21 can have, for example, an inside diameter of 20 cm.

The tube is usually closed at the lower end 25. If it is open, then the spent catalyst or solid 10 can be discharged by way of this end. Inside the tube 21 there is an inner tube 22 with a much smaller diameter (for example, with an inside diameter of 7.5 cm), which is open at the lower end towards the catalyst bed. At this point the pyrolysis vapors 1 and optionally the solid pyrolysis products are fed to the reforming reactor. After they are passed through the heated catalyst bed contained in the tube 21, they are discharged by way of the lower end of the inner tube; the reformed pyrolysis vapors 2 that are formed can then be fed to an additional after-treatment or a separation unit.

If a catalytic hydrogenation of the pyrolysis oil that is formed is supposed to take place, then the pyrolysis oil is fed to a hydrogenation reactor, in which hydrogenation is carried out under elevated pressure. One example that can be mentioned is a hydrogenation with a sulfurized NiMo—$Al_2O_2$ catalyst at 370 degrees Celsius and at 140 bar pressure, where the catalyst loading (LHSV) is 0.3 $h^{-1}$ (30 ml/h); and the addition of hydrogen is 1,500 l (l.N.) $H_2$/l of pyrolysis oil. Using the method, which is described in detail above, not only the pyrolysis oil (which is about 10 to 20% by wt. based on the feedstock), but also hydrogen-rich synthesis gas (30 to 40% by wt.), an aqueous phase (18 to 25% by wt.) and pyrolysis coke (20 to 42% by wt.) are obtained.

Table 1 shows for various feedstocks (row 1 shows the origin of the feedstock in brackets) the hydrogen content of the non-condensable fractions of the pyrolysis vapor obtained in step B). Column 2 shows the ash content of the solid obtained in the pyrolysis process; columns 3 to 6 show the fraction of hydrogen, methane, CO and $CO_2$ in % by wt. (based on the total weight of the non-condensable fractions of the pyrolysis vapor). In addition, other hydrocarbons $C_xH_y$ can be contained. At variance with the measurement method used in accordance with the present patent application, the gas composition for Table 1 was measured with a gas analyzer based on an infrared photometer (CO, $CO_2$, $CH_4$) and a thermal conductivity detector ($H_2$).

TABLE 1

| Feedstock | Ash Content | $H_2$ | $CH_4$ | $CO_2$ | CO |
|---|---|---|---|---|---|
| Wood pellets (cut lengths Baywa) | 0.35 | 17 | 5 | 40 | 10 |
| Digestate 1 (Loick company) | 13.6 | 30-35 | 5-10 | 20-30 | 15-25 |
| Digestate 1 (Loick company) | 17.9 | 35-40 | 1-5 | 20-30 | 15-25 |
| Digestate 1 (Loick company) with additional water | 17.9 | 45-50 | 3 | 25-30 | 15 |
| Sewage sludge 1 (E&T Aichaberg GmbH) | 37.9 | 35-37 | 1-2 | 22 | 10 |
| Sewage sludge 2 (E&T Aichaberg GmbH) | 60 | 37-40 | 1-2 | 26-27 | 9 |
| Sewage sludge 3 (E&T Aichaberg GmbH) | >43 | | | | |
| Straw (Baywa) | 5.1 | 30-35 | 10-15 | 25-30 | 15-20 |
| Pig manure (Laubhof, Hahnbach) | 35.6 | 41-44 | 1-2 | 30-32 | 14 |
| Grape pomace (Riciarelli, Italy) | 5.2 (7.0) | 35-40 | 1-4 | 20-25 | 10-15 |
| Olive pomace (Riciarelli, Italy) | 6.3 | 25-30 | 1-2 | 15-20 | 10-15 |
| Coffee grounds (Barocco, Cafe Zental, Amberg) | 5.1 | 30 | 3 | 23 | 19 |
| Paper slurry (UPM Ettringen) | 50 | 35 | 1-2 | 14 | 10 |
| Mill byproducts (Baywa) | 7 | 17-20 | 3 | 17 | 37 |
| Paper rejects (Smufit Kappa Rejects) | 8.8 | 29 | 0 | 12 | 7 |
| Walnut shells (Enerblu, Mexico) | 15.6 | 44 | 2 | 33 | 14 |
| Horse manure (Hochschule Rosenheim) | 11.2 | 37 | 5 | 32 | 13 |
| Lignin | 17.9 | 32 | 11 | 23 | 15 |
| Municipal solid waste (A2A, Italy) | 15 | 36 | 1-2 | 21 | 12 |
| Rejects (Loick company) | 31 | 32 | 2 | 29 | 12 |

A whole series of biogenic or partially biogenic feedstocks were tested using the method, which was explained in more detail above. In this case the values that are given in the description, the claims and the examples were always determined (unless stated otherwise) as follows:

Density at 15 degrees Celsius in accordance with DIN EN ISO 12185,
kinetic viscosity at 40 degrees Celsius in accordance with DIN EN ISO 3104,
acid value in accordance with DIN EN 14104,
flash point in accordance with DIN ISO 3679,
sulfur content in accordance with DIN EN ISO 20884,
phosphorus content in accordance with DIN EN 14107,
oxygen content in accordance with DIN EN 15296 (calculated);
carbon content, hydrogen content and nitrogen content in accordance with DIN EN 15104,
fuel value (qV, gr) in accordance with DIN EN 14918,
calorific value (qp, led) in accordance with DIN EN 14918,
ash content in accordance with DIN EN 14775, however, at 815 degrees Celsius.

At this point it should be noted once again that (unless explicitly stated otherwise) the contents of hydrogen, oxygen, carbon, sulfur and nitrogen in accordance with the standard measurement methods relate only to the weight of the organic components of the pyrolysis oil and the ash; as a result, the water contained in the pyrolysis water is not considered.

The following tables show the various analysis results. In this case Table 2 shows the relevant parameters for the resulting pyrolysis oil for various feedstocks (row 1 shows the origin of the feedstock in brackets; the term "as Tab. 1" means that it is the same material as in Table 1) at different temperatures (and in one case without a post-conditioning step).

Table 3 shows for the pyrolysis oil, obtained from the sewage sludge at 700 degrees Celsius (see Table 2, row 2, column 3) the percentage by weight of some significant organic compounds contained therein.

Tables 4 and 5 show for the sewage sludge 3 (from Table 1) as a feedstock the effect of the residence time of the pyrolysis vapors in the reforming reactor or in the post-conditioning zone. It can be seen in Table 5 that at longer residence times the yield of pyrolysis oil is reduced, and the hydrogen to carbon ratio is reduced, an aspect that is probably due to the formation of polycyclic hydrocarbon compounds. Table 5 shows all of the products (for complete and continuous use of the pyrolyzed solids as the catalyst). It can be seen that in the case of residence times that are too large, the yield of pyrolysis oil drops sharply; and, in turn, the gas content increases.

Table 6 shows the yields during distillation of the pyrolysis oil of the present invention. In this case vacuum distillation is carried out, as explained above, at 100 mbar (abs) by means of a glass assembly consisting of a distillation bridge, a glass flask and a heating jacket. The feedstocks that are used include the pyrolysis oils that are obtained from (reformed) sewage sludge post-conditioned at 500 degrees Celsius, "digestate 1" post-conditioned at 700 degrees Celsius (see Table 2, row 1, column 8 and row 2, column 2) as well as wood pellets (cut lengths Baywa) post-conditioned at 700 degrees Celsius.

Table 7 shows the results of the additional post-conditioning steps for the pyrolysis oil, which is obtained from sewage sludge post-conditioned at 500 degrees Celsius (see Table 2, row 2, column 2). It was found that the fraction of hetero atoms (O, N, S) can be significantly reduced by both hydrogenation as well as by distillation. This is also associated with a further significant reduction in the acid value and an increase in the calorific value and the viscosity.

The hydrogenated middle distillate meets more or less the requirements for diesel fuels in accordance with EN 590 (in each case the values required by the above standard are shown in brackets):

cetane number: 43 (≥51); cetane index: 47 (≥46); density at 15 degrees Celsius: 840 kg/m³ (820-845);

sulfur content: 19.9 mg/kg (≤10); flash point: 86 degrees Celsius (≥55 degrees Celsius);

ash content: <0.005% by wt. (≤0.01); water content: 55 mg/kg (≤200);

copper corrosion: class 1 (class 1); lubricity at 60 degrees Celsius: 196 μm (≤460 μm);

viscosity at 40 degrees Celsius: 2.855 mm²/s (2 to 4.5); CFPP: −11 degrees Celsius (−20 degrees Celsius to 0 degrees Celsius);

volume at 250 degrees Celsius: 54% v/v (<65); volume at 350 degrees Celsius: 92.7% v/v (≥85);

95% (v/v) residue: 360 degrees Celsius (≤360). Cetane number and sulfur content are primarily from

TABLE 2

| | Feedstock | | | | | | | | |
|---|---|---|---|---|---|---|---|---|---|
| | Straw (Baywa) | Grape pomace (as Tab. 1) | Olive pomace (as Tab. 1) | Olive pomace (as Tab. 1) | Digestate 1 (as Tab. 1) | Digestate 1 (as Tab. 1) | Digestate 1 (as Tab. 1) | Digestate 2 (neue energie steinfurt GmbH) | Digestate 3 (Italy) |
| Reformer temperature/ deg. C. | 630 | 700 | 500 | 700 | no reforming | 500 | 700 | 700 | 700 |
| Residence time pyrolysis vapors/s | 7 | 5 | 11 | 5 | — | 11 | 5 | 5 | 5 |
| Water content % by wt. | 1.0 | 13.6 | 2.0 | 1.2 | 26.6 | 28.4 | 20.5 | 5.0 | 2.2 |
| Ash (815 deg. C.) % by wt. | <0.05 | 01 | <0.05 | <0.05 | 0.4 | 0.2 | 0.1 | 0.2 | <0.05 |
| H % by wt. | 9.92 | 7.24 | 10.2 | 7.37 | 5.54 | 5.97 | 5.58 | 7.55 | 8.0 |
| C % by wt. | 78.0 | 59.7 | 77.5 | 84.4 | 55.1 | 55.8 | 63.2 | 74.2 | 77.6 |
| N % by wt. | 1.95 | 3.76 | 1.65 | 3.23 | 3.61 | 3.73 | 4.11 | 4.38 | 4.6 |
| O % by wt. | 8.7 | 15.3 | 8.4 | 3.5 | 7.8 | 5.0 | 5.6 | 7.8 | 7.0 |
| Fuel value: kJ/kg | 38,200 | 23,900 | 38,400 | 36,800 | 25,200 | 26,300 | 28,000 | 33,200 | |
| Calorific value kJ/kg | 36,000 | 22,000 | 36,100 | 35,200 | 23,400 | 24,300 | 26,300 | 31,500 | 34,000 |
| Sulfur % by wt. | 0.42 | 0.28 | 0.22 | 0.27 | 0.88 | 0.88 | 0.84 | 0.99 | 0.6 |
| Acid value (TAN) mg KOH/g | 4.64 | 4.36 | 12.13 | 2.1 | 23.65 | 8.83 | 5.06 | 2.37 | 2.1 |

| | Feedstock | | | | | | | |
|---|---|---|---|---|---|---|---|---|
| | Sewage sludge 1 (as Tab. 1) | Sewage sludge 1 (as Tab. 1) | Paper slurry (as Tab. 1) | Paper slurry (as Tab. 1) | Paper rejects (as Tab. 1) | Rejects (as Tab. 1) | Municipal solid waste (as Tab. 1) | Baby wipes (as Tab. 1) |
| Reformer temperature/ deg. C. | 500 | 700 | 500 | 700 | 700 | 700 | 700 | 700 |
| Residence time pyrolysis vapors/s | 11 | 5 | 11 | 5 | 5 | 5 | 5 | 5 |
| Water content % by wt. | 2.45 | 2.7 | 0.7 | 0.6 | 0.2 | 0.35 | 3.2 | 0.1 |
| Ash (815 deg. C.) % by wt. | <0.05 | 0.2 | 0.1 | 0.2 | 0.1 | <0.05 | <0.05 | 0.1 |
| H % by wt. | 10.0 | 6.89 | 8.99 | 7.95 | 7.86 | 10.4 | 7.28 | 8.11 |
| C % by wt. | 74.9 | 74.9 | 81.9 | 84.9 | 84.2 | 80.6 | 81.1 | 87.6 |
| N % by wt. | 5.9 | 8.3 | 1.37 | 1.41 | 0.52 | 1.2 | 1.72 | 0.27 |
| O % by wt. | 7.3 | 6.1 | 6.8 | 4.8 | 7.0 | 6.4 | 6.5 | 3.8 |
| Fuel value: kJ/kg | 37,300 | 34,300 | 39,200 | 38,500 | 40,200 | | 37,000 | 39,300 |
| Calorific value kJ/kg | 35,200 | 32,800 | 37,300 | 36,800 | 38,500 | 37,100 | 35,400 | 37,500 |
| Sulfur % by wt. | 1.2 | 0.99 | 0.29 | 0.2 | 0.13 | 0.2 | 0.23 | 0.78 |
| Acid value (TAN) mg KOH/g | 8.33 | 4.45 | 5.81 | 2.15 | 2.44 | 1.2 | 6.14 | 1.58 |

TABLE 3

| | |
|---|---|
| Acids | 0.00% |
| Water | 1.7% |
| Non-aromatic ketones | 1.2% |
| Benzene, toluene, xylene | 8.3% |
| Phenols | 12.9% |
| Phenanthrenes | 0.3% |
| Indoles | 1.7% |
| Naphthalenes | 1.5% |
| Sugars | 0.0% |
| Guaiacols (methoxyphenols) | 0.0% |
| Syringols (dimethoxyphenols) | 0.0% |

TABLE 4

| | Reformer temperature | | | |
|---|---|---|---|---|
| | 700 deg. C. | 700 deg. C. | 500 deg. C. | no reforming |
| Properties of the | Residence time of the pyrolysis vapors | | | |
| pyrolysis oil | 8 seconds | 150 seconds | 8 seconds | — |
| Water content % by wt. | 1.4 | 1.6 | 2.6 | 7.7 |
| TAN (mgKOH/g) | 3.2 | 2.8 | 8.4 | 19.7 |
| C % by wt. | 79.92 | 80.40 | 76.05 | 68.08 |
| H % by wt. | 8.95 | 7.43 | 9.29 | 9.86 |
| N % by wt. | 6.51 | 7.98 | 7.33 | 6.10 |
| O % by wt. | 2.72 | 1.86 | 4.15 | 7.25 |
| S % by wt. | 0.62 | 0.74 | 0.59 | 1.01 |
| Fuel value: kJ/kg | 38,080 | 36,550 | 37,550 | 34,760 |
| Calorific value kJ/kg | 36,080 | 34,880 | 34,450 | 32,400 |

TABLE 5

| Reformer temperature | Residence time of the pyrolysis vapors | Pyrolyzed solid | Aqueous phase | Pyrolysis oil | Gas |
|---|---|---|---|---|---|
| 700 deg. C. | 8 seconds | 53 | 17 | 9 | 21 |
| 700 deg. C. | 150 seconds | 53 | 18 | 4 | 25 |
| 500 deg. C. | 8 seconds | 55 | 23 | 11 | 11 |
| no reforming | — | 63 | 21 | 9 | 7 |

TABLE 6

| Feedstock | Temperature range at 100 mbar (abs.) | Yield (Distillate) | Residue (heavy oil) |
|---|---|---|---|
| Digestate 1 | 20-280 deg. C. | 81% by wt. | 19% by wt. |
| Sewage sludge | 20-280 deg. C. | 85% by wt. | 15% by wt. |
| Wood pellets | 20-280 deg. C. | 81% by wt. | 19% by wt. |

TABLE 7

Feedstock: Sewage Sludge

Additional post-conditioning

| | none | distillation | hydrogenation | 1. hydrogenation 2. distillation | |
|---|---|---|---|---|---|
| | | | | low boiler <200 deg. C. | middle distillate >200 deg. C. |
| Density kg/m³ | 960.5 | 911.3 | 811.2 | 731.7 | 840.0 |
| Water content % by wt. | 2.45 | 4.81 | 0.0047 | — | 0.0055 |
| Kin. viscosity mm²/s | 9.26 | 3.00 | 1.46 | 1.46 | 2.85 |
| H % by wt. | 10.0 | 10.6 | 13.6 | 14.4 | 13.4 |
| C % by wt. | 74.9 | 77.6 | 86.0 | 85.6 | 85.8 |
| N % by wt. | 5.9 | 5.6 | <0.5 | <0.5 | <0.5 |
| O % by wt. | 7.3 | 4.6 | 0.7 | <0.01 | 0.5 |
| Fuel value: kJ/kg | 37,300 | 38,085 | 45,270 | — | 45,162 |
| Calorific value kJ/kg | 35,200 | 35,820 | 42,529 | 43,980 | 42,319 |
| Sulfur % by wt. | 1.20 | 0.59 | 0.0015 | 0.0004 | 0.002 |
| Acid value (TAN) mg KOH/g | 8.33 | 4.2 | <0.1 | <0.1 | <0.1 |

Figure 2:
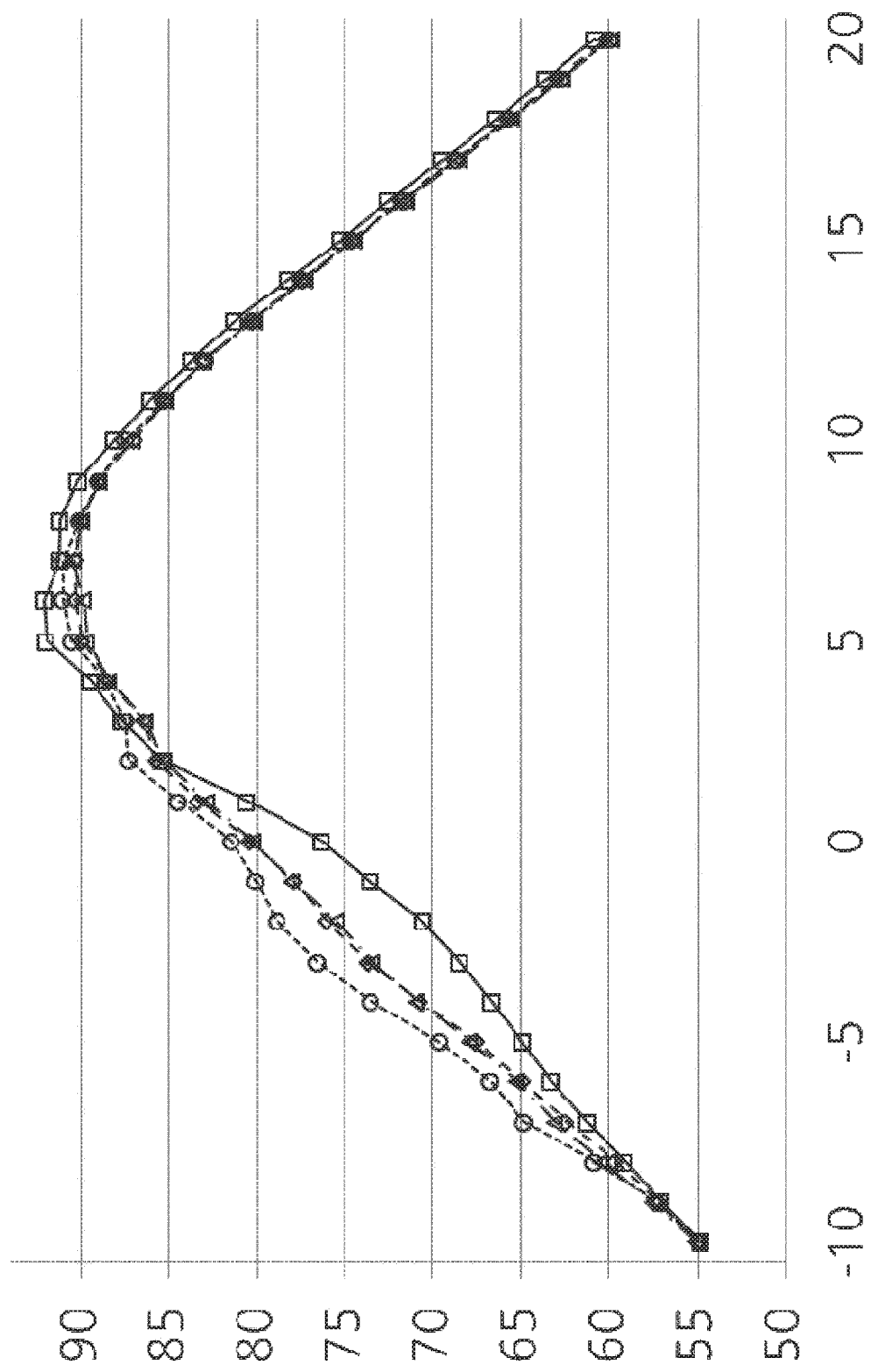
FIG. 2 shows the results of a series of tests, with the suitability of the pyrolysis oils of the present invention tested as a diesel fuel or as a diesel additive.

FIG. 2 shows the results of a series of tests, with the suitability of the pyrolysis oils of the present invention tested as a diesel fuel or as a diesel additive. Said figure shows the curves of the cylinder pressure in bar, plotted against the crank angle (−10 deg. to 20 deg.). Non-hydrogenated oil as shown in Table 2, row 1, column 8 ("digestate 1"), which was obtained from a digestate at 700 degrees Celsius reforming temperature, was used as the pyrolysis oil of the invention. These results were obtained using a diesel engine of the brand Kubota Model V3300. At this point FIG. 2 shows that mixtures of the pyrolysis oil (PO) of the present invention with rapeseed methyl ester (RME) (squares: 75% PO-25% RME; diamonds: 50% PO-50% RME; triangles 10% PO-90% RME) yield results that are just as good as pure rapeseed methyl ester (circles).

The invention claimed is:

1. A method for producing a pyrolysis oil, the method comprising:
   pyrolysing a feedstock substantially in the absence of oxygen in a pyrolysis zone, in which the feedstock is heated to a temperature that is in a range of 250 degrees Celsius to 700 degrees Celsius, wherein a residence time of a material to be pyrolysed in the pyrolysis zone is in a range of one second to one hour, and pyrolysed solids and pyrolysis vapors are formed;
   post-conditioning at least the pyrolysis vapors in a post-conditioning zone, in which the pyrolysis vapors are brought into contact with a catalyst bed containing a catalyst, wherein said catalyst comprises the pyrolysed solids, which are directly obtained by pyrolysing the feedstock, wherein a residence time of the pyrolysis vapors in the post-conditioning zone is in a range from $10^{-3}$ seconds to 180 seconds and wherein the post-conditioning is carried out at a temperature in a range of 450 degrees Celsius to 800 degrees Celsius, wherein the temperature of the post-conditioning is at least 50 degrees Celsius higher than the temperature of the pyrolysing, and wherein, upon condensation, the pyrolysis oil is formed; and
   separating the pyrolysis oil from other pyrolysis products that are formed in a separation unit.

2. The method of claim 1, wherein the feedstock includes a biogenic material.

3. The method of claim 1, wherein the feedstock comprises a digestate, a digestate from a biogas process, a digestate from a bioethonal process, a cellulose-containing material, agricultural waste, straw, industrial biomass residue, brewer's spent grain, grape pomace, olive pomace, nut shells, coffee grounds, spent grease, animal fat, slurries from recycling of paper, manure-containing materials, sewage sludge, or any mixture thereof.

4. The method of claim 1, wherein the feedstock comprises a polymer, a polyacrylate, a polyurethane, a polyester, a polyolefin, rubber, or any mixture thereof.

5. The method of claim 1, wherein the feedstock, for the production of the catalyst used in the post-conditioning, has an ash content in accordance with DIN EN 14775 of no less than 1% by weight.

6. The method of claim 1, wherein the feedstock comprises acids or is selected in such a way that, during the pyrolysing, acids are formed, and wherein the feedstock comprises lignocellulose, acrylate groups, urethane groups, or ester groups.

7. The method of claim 1, wherein a lignocellulose content of a biogenic fraction of the feedstock is greater than 5% by weight.

8. The method of claim 1, wherein, in the post-conditioning, the catalyst comprises a pyrolysed solid having a highest level of catalytic activity after being fed to the pyrolysis zone, and wherein the catalyst used in the post conditioning and the pyrolysis oil formed in the post-conditioning were obtained at least partially from the feedstock that was pyrolysed.

9. The method of claim 1, wherein a residence time of the catalyst in the post-conditioning zone is a maximum of 12 hours.

10. The method of claim 1, wherein, in the post-conditioning, the pyrolysis vapors are fed to the post-conditioning zone in such a way that a volume flow of the pyrolysis vapors is passed completely through flow paths present in the catalyst bed, wherein the catalyst bed is arranged in the post-conditioning zone in such a way that a cross sectional area of the post-conditioning zone arranged perpendicular to a direction of flow is present so as to be filled completely with the catalyst bed.

11. The method of claim 10, wherein, in the post-conditioning, the pyrolysed solid directly obtained by pyrolysing the feedstock is supplied continuously as the catalyst, and the volume flow of the pyrolysis vapors is passed through the catalyst bed in such a way that the pyrolysis vapors come into contact with a last supplied catalyst immediately at the start of the post-conditioning.

12. The method of claim 1, wherein, in the pyrolysing, a residence time of the material to be pyrolysed is in a range of one minute to one hour, and, in the pyrolysing, continuously or semi-continuously a pyrolysed material is fed back directly into a region of the pyrolysis zone that faces away from the post-conditioning zone, wherein a mixing of the pyrolysed material with the feedstock is carried out at least in the region of the pyrolysis zone that faces away from the post-conditioning zone.

13. The method of claim 12, wherein the residence time during the post-conditioning is in a range of 1 second to 60 seconds; and the temperature in the post-conditioning is no less than 600 degrees Celsius.

14. The method of claim 1, wherein the pyrolysis oil or the other pyrolysis products, during the post-conditioning or the separating, are subjected to a catalytic hydrogenation.

15. The method of claim 1, wherein a distillation of the pyrolysis oil takes place during the separating.

16. The method of claim 1, wherein during the pyrolysing of the feedstock, the temperature to which the feedstock is heated is in a range of 400 degrees Celsius to 500 degrees Celsius.

17. The method of claim 1, wherein the residence time of material to be pyrolysed in the pyrolysis zone is in a range of 3 minutes to 10 minutes.

18. The method of claim 1, wherein the post-conditioning is carried out at a temperature in a range of 600 degrees Celsius to 750 degrees Celsius.

19. The method of claim 1, wherein the pyrolysis oil comprises a carbon content greater than 65% by wt., a hydrogen content greater than 5% by wt., an oxygen content of less than 16% by wt., a $^{14}C$ content of no less than 0.1 parts per trillion, and an acid value of less than 15 mg of KOH/g.

20. The method of claim 1, wherein an acid value of the pyrolysis oil is less than 10 mg of KOH/g.

21. The method of claim 1, wherein oxygen content of the pyrolysis oil is less than 8% by weight.

22. The method of claim 1, wherein a weight ratio of hydrogen/carbon of the pyrolysis oil is greater than 0.08.

23. The method of claim 1, wherein a water content of the pyrolysis oil is less than 5% by weight.

24. A method for producing a pyrolysis oil, the method comprising:

pyrolysing a feedstock substantially in the absence of oxygen in a pyrolysis zone, in which the feedstock is heated to a temperature that is in a range of 250 degrees Celsius to 700 degrees Celsius, wherein a residence time of a material to be pyrolysed in the pyrolysis zone is in a range of one second to one hour, and pyrolysed solids and pyrolysis vapors are formed;

post-conditioning at least the pyrolysis vapors in a post-conditioning zone, in which the pyrolysis vapors are passed through a catalyst bed containing a catalyst, wherein said catalyst consists of the pyrolysed solids, which are directly obtained by pyrolysing the feedstock, wherein a residence time of the pyrolysis vapors in the post-conditioning zone is in a range from $10^{-3}$ seconds to 180 seconds and wherein the post-conditioning is carried out at a temperature in a range of 450 degrees Celsius to 800 degrees Celsius, and wherein, upon condensation, the pyrolysis oil is formed; and separating the pyrolysis oil from other pyrolysis products that are formed in a separation unit.

25. A method for producing a pyrolysis oil, the method comprising:

pyrolysing a feedstock substantially in the absence of oxygen in a pyrolysis zone, in which the feedstock is heated to a temperature that is in a range of 300 degrees Celsius to 600 degrees Celsius, wherein a residence time of a material to be pyrolysed in the pyrolysis zone is in a range of three minutes to one hour, and pyrolysed solids and pyrolysis vapors are formed;

post-conditioning at least the pyrolysis vapors in a post-conditioning zone, in which the pyrolysis vapors are brought into contact with a catalyst bed containing a catalyst, wherein said catalyst comprises the pyrolysed solid, which are directly obtained by pyrolysing the feedstock, wherein the post-conditioning is carried out at a temperature in a range of 500 degrees Celsius to 800 degrees Celsius, wherein the residence time of the pyrolysis vapors in the post-conditioning zone is in a range from 0.1 seconds to 120 seconds, and wherein, upon condensation, the pyrolysis oil is formed; and separating the pyrolysis oil from other pyrolysis products that are formed in a separation unit.

* * * * *